United States Patent [19]

Prejean

[11] Patent Number: 5,373,041
[45] Date of Patent: Dec. 13, 1994

[54] HOT MELT PRESSURE SENSITIVE ADHESIVES

[75] Inventor: George W. Prejean, Orange, Tex.

[73] Assignee: E. I. Du Pont de Nemours and Company, Wilmington, Del.

[21] Appl. No.: 571,912

[22] Filed: Aug. 27, 1990

[51] Int. Cl.$^5$ .......................... C08K 5/51; C08K 5/11; C08K 5/12
[52] U.S. Cl. .................................. 524/143; 524/272; 524/286; 524/296; 524/297; 524/306; 524/311; 524/351; 524/352; 524/372; 524/560; 524/562
[58] Field of Search .............. 524/143, 272, 286, 296, 524/297, 306, 311, 351, 352, 372, 560, 562

[56] References Cited

U.S. PATENT DOCUMENTS

| | | | |
|---|---|---|---|
| 3,249,570 | 5/1966 | Potts et al. | 524/562 |
| 3,849,353 | 11/1974 | Taft et al. | 260/27 |
| 4,338,227 | 7/1982 | Ballard | 524/143 |
| 4,816,306 | 3/1989 | Brady et al. | 428/36.92 |
| 4,874,804 | 10/1989 | Brady et al. | 524/100 |

*Primary Examiner*—John Kight, III
*Assistant Examiner*—R. F. Johnson
*Attorney, Agent, or Firm*—Craig H. Evans; Peter A. Fowell

[57] ABSTRACT

A pressure sensitive adhesive composition which can be applied by hot melt techniques to one surface and adhered to a second surface by contact at ambient temperature, to thereby bond the two surfaces together. The adhesive composition is made of certain ethylene/n-butyl acrylate copolymers together with tackifier and optionally, plasticizer.

9 Claims, No Drawings

HOT MELT PRESSURE SENSITIVE ADHESIVES

BACKGROUND OF THE INVENTION

1. Field of Invention

This invention relates to pressure sensitive adhesives, which can be applied to a substrate as a melt, and more particularly to such adhesives based on copolymers of ethylene and n-butyl acrylate and optionally acrylic acid or methacrylic acid and ionomers of such acid copolymers.

2. Description of Related Art

Hot melt pressure sensitive adhesives (HMPSA) are one of the most widely used types of adhesives used today. They are typically coated as a melt onto a substrate, and the resulting adhesive coating operates as a pressure sensitive adhesive at ambient temperature. Substrates may be paper, metal, foil, plastics etc., and when coated with HMPSA may be useful as tapes, labels, floor covering, bookbinding and hot melt sealants. HMPSA may also be used for adhesion of metals, plastics, wood or other materials.

Block copolymers of styrene-isoprene have been used in HMPSA, but these adhesives exhibit deficient thermal, oxidative, and UV stability and oil resistance arising from the properties of the block copolymers.

Ethylene vinyl acetate (EVA) copolymers have been used as hot melt adhesives (HMA). These copolymers have had little commercial acceptance in HMPSA adhesive composition however, for several reasons. First, the EVA tends to bleed into and through permeable substrates, particularly at slightly elevated temperatures. Second, the EVA has known shortcomings with respect to thermal stability. U.S. Pat. No. 4,338,227 to Ballard discloses the use of compositions based on crosslinked EVA copolymers as HMPSA to avoid the bleeding problem and to reduce the adhesive cold flow at 50°-60° C. Even so, crosslinked EVA based HMPSA compositions have not been commercially successful to date. Thus, the most popular copolymer used in HMA has not found utility in HMPSA.

The use of ethylene/n-butyl acrylate copolymers having a melt index of at least 50 in HMA compositions is disclosed in U.S. Pat. Nos. 4,816,306 and 4,874,804 to Brady et al. These patents disclose the use of tackifiers and a high melting synthetic wax in the HMA. There is no disclosure in these patents of the compositions being useful as HMPSA and indeed, the presence of the wax would prevent such use.

U.S. Pat. No. 3,849,353 discloses hot melt compositions useful as HMPSA which contain the combination of (a) copolymers of ethylene and vinyl acetate and/or alkyl acrylate; (b) atactic polypropylene; and (c) vulcanized rubber. Of the alkyl acrylate copolymers possible, ethylene/butyl acrylate is one of the preferred. Components (a) and (c) are disclosed to provide cohesive properties to the adhesive and component (b) is disclosed to provide compatibility with tackifiers. Component (b) by itself is somewhat tacky at ambient temperature. Component (a) is present in amounts up to 50% based on the weight of (a), (b), and (c) and components (b) and (c) make up the remainder of the composition. Tackifier may be added to this composition in an amount up to 50% of the weight of the composition.

There is a commercial need for a HMPSA having good thermal, oxidative and UV stability which does not bleed or lose its adhesive performance at somewhat elevated temperatures.

SUMMARY OF THE INVENTION

The present invention satisfies this need by providing a hot melt pressure sensitive adhesive composition consisting essentially of (a) about 25 to 50% by wt. of copolymer having a melt index of about 5 to 40 g/10 min. of (i) about 60 to 70% by wt. of ethylene, (ii) about 30 to 40% by wt. of n-butyl acrylate, and (iii) 0 to about 5% by wt. of (meth) acrylic acid, based on the weight of the copolymer, with the acid being 0 to about 40% neutralized by metal ions and (b) tackifier and optionally, plasticizer, in an effective amount from about 50 to 75% by wt. based on the total weight of the composition whereby said composition is a pressure sensitive adhesive.

DETAILED DESCRIPTION OF THE INVENTION

The present invention includes the discovery that the simple random copolymer within a certain melt index range of ethylene and n-butyl acrylate in certain proportions can be formulated to form an adhesive which can be applied to a substrate as a hot melt and when cooled to ambient temperature, provides pressure sensitivity to provide a strong bond to another substrate insofar as both adhesive strength and cohesive strength of the adhesive coating itself are concerned. The copolymer also provides thermal, oxidative, and UV stability and oil resistance to the composition. Furthermore, the presence of (meth)acrylic acid as a termonomer can improve adhesion at moderately elevated temperatures, and provide additional versatility in some instances where adhesion to polar materials as well as non-polar materials is particularly important. The improvement in moderate temperature adhesion is shown by increasing shear adhesion failure temperature with increasing acid content and increasing neutralization of the acid. Preferably adhesive compositions of the present invention exhibit a shear adhesion failure temperature (SAFT) of at least 55° C. The copolymer component has the combination of low glass transition temperature, and residual crystallinity to give HMPSA formulations having a good combination of tack at ambient temperatures and utility at moderately elevated temperatures. The copolymer component is a rubbery material and is essentially tack-free at ambient temperature.

If the level of n-butyl acrylate is below about 30% by weight, the copolymer is not flexible enough and cannot be formulated to give acceptable properties. If the level of n-butyl acrylate is above about 40% by weight, the copolymer will be excessively soft and difficult to handle or pelletize and the resultant adhesive composition loses useful properties at moderately elevated temperatures. Blends of ethylene/n-butyl acrylate copolymer can be used wherein the acrylate content of the individual copolymers is greater and/or less than the desired 30–40 wt. % range, but the average acrylate content of the blend will fall within the 30–40% range. If the level of acrylic or methacrylic acid, when present, is above 5%, the tack of the adhesive composition tends to diminish. If acid co-monomer is used, it will generally comprise at least 0.5 wt. % of the copolymer. In the case of copolymers containing acid comonomer, the acid group may be partially neutralized with metal ions, e.g., Zn and Na, to form ionomer.

The melt index of the copolymer should be from about 5–40 g/10 min. so as to provide cohesive strength to the adhesive composition.

In addition to the ethylene copolymer present in the HMPSA composition, the composition contains an effective amount of tackifier to generate pressure sensitive adhesive performance. Examples of tackifiers suitable for use individually or in combination in compositions of the present invention include:

a) Wood, gum or tall oil derived rosin acids. They can be hydrogenated disproportionated or mildly polymerized.

b) Esters of the various classes of rosin acids referred to above. Alcohols suitable for preparing these esters include mono- and polyethylene glycols, glycerol, pentaerythritol and related products.

c) Terpene resins d) Dicylcopentadiene-aromatic hydrocarbon resins such as those described in U.S. Pat. No. 3,023,200 covering 'Piccovar' resins.

e) Low molecular weight resins based on styrene and/or substituted styrenes.

The proportion of tackifier will depend on the identity of the ethylene copolymer and tackifier, but generally an effective amount of tackifier in the composition will be in the range of about 25 to 65% by wt., and preferably about 40 to 60 % by wt. based on the weight of the composition, i.e., the wt. of the copolymer, tackifier and plasticizer, if present. The tackifier is selected so as to be compatible with the copolymer and plasticizer, if present. Some tackifiers which are liquid (fluid) at ambient temperature also plasticize the copolymer. Preferred tackifiers are the rosin esters.

The adhesive composition can also contain one or more plasticizers, preferably liquid at ambient temperatures, to modify or adjust pressure sensitive performance by changing properties of the adhesive composition, especially flexibility to the level best suited for the use to which the adhesive will be put. Examples of plasticizers which can be used in compositions of the present invention include:

a) Typical phthalates, azelates, adipates, tricresyl phosphate, and polyesters, such as those used in flexibilizing polyvinyl chloride.

b) Low molecular weight resins made from alkylated phenols, phenol, modified Coumarone-indene, terpenes and synthetic terpenes.

d) Petroleum derived processing oils which are widely used in the compounding and/or extending of rubber compositions. They are generally classed as aromatic, naphthenic or aliphatic in character, the classification just identifying the major oil type present. They are available over a wide range of viscosities, form as low as 60 to over 15000 SUS viscosity at 100° F. (37.8° C.). The type of oil and its viscosity both have some affect on the performance of of the HMPSA in which it is used. Generally speaking, oils with a viscosity of greater than 200 SUS are preferred in the compositions of this invention. Preferred plasticizers are naphthenic processing oils.

The adhesive compositions of the present invention may consist essentially of the ethylene copolymer and tackifier without the presence of plasticizer and still provide useful pressure sensitive adhesive properties. In this embodiment, the choice of tackifier provides plasticizing of the adhesive composition. When plasticizer is used, however, generally no greater than about 5 to 25% by wt. based on the weight of the composition (copolymer, tackifier, and plasticizer) will be necessary.

The adhesive of the present invention may also contain one or more antioxidants to enhance the stability of the adhesive when in the molten state, or during long term storage in bulk form and/or after the adhesive has been applied to the base stock and/or the adhesive coated base stock (paper, film or foil) has been put into use. Suitable antioxidants include typical hindered phenols available as butylated hydroxytoluene (BHT), 'Ethyl' 330, Geigy 'Irganox' 1010, as well as phosphites, and butyl zimate.

The adhesive compositions of the present invention can be prepared by any of the conventional means by which two or more ingredients are brought into intimate contact with each other to produce a homogeneous blend. For example, the polymer, tackifier, plasticizer and antioxidant can be brought together in a container and subjected to mixing in the molten state at a temperature of about 100° to 200° C. until a homogeneous blend is obtained.

The HMPSA of the present invention can be applied to the particular substrate by any of the well known methods of applying coatings of molten adhesives. For example, the HMPSA coating can be applied by extrusion, a heated doctor blade, or with a rotating roller partially submerged in a tank of the molten adhesive. In addition to melt application, these adhesives can also be applied to the substrate from an organic based solution or an aqueous dispersion. The adhesive compositions of the present invention are capable of adhering a wide variety of substrates together, such as disclosed hereinbefore, the first substrate achieving adhesion by melt application of the composition and the second substrate achieving adhesion by pressing against the adhesive composition at ambient temperature.

EXAMPLES

In the following examples which are provided for illustrative purposes only, all parts and percents are by weight and all temperatures in degrees Celsius unless otherwise noted.

In the examples, all adhesive formulations were prepared in a half pint paint can which was placed in an aluminum block heated with an electrical heater to a temperature of 200° C. The tackifiers and plasticizers were first placed in the can and allowed to come to a temperature of about 180° C. at which time the polymers and the antioxidants were added. These mixtures were stirred with an air driven motor using a three bladed commercial propeller agitator until the polymer was molten and fully dissolved.

The molten hot melt adhesive at about 200° C. was applied to either Mylar ® PET film or "Kromecoate" paper utilizing a laboratory hot melt coater (Model TY 770 from Acumeter Laboratories).

The adhesives were then subjected to the following tests which provide some measure of the characteristics desired for a successful HMPSA. Each measures a somewhat different aspect of pressure sensitive adhesive behavior: Polyken Tack; Shear Adhesion Failure Temperature (SAFT); and 180 degree peel adhesion.

The Polyken Tack test gives a guide to the stickiness and wettability of the adhesive composition. It measures ease of removal of a probe after contact with the adhesive under controlled contact conditions. The test procedure is given in ASTM D2979-71. Samples were conditioned to 50% R.H. and tested at 25° C. The dwell time for the probe in contact with the adhesive was 1 second. The travel speed of the probe on removal was 1.0 cm/sec. The annular ring weight used weights of approximately 20 g. corresponding to a 100 g/sq.cm. load on the probe. For a permanent type HMPSA, a tack of at least 300 g is desirable. Lower values are acceptable where a degree of removability is desired.

The Shear Adhesion Failure Temperature (SAFT) test provides a guide to the cohesive strength of the adhesive as temperature is increased. It was conducted in a temperature programmed oven, programmed for the temperature to increase at the rate of 10 degrees C. per hour. An adhesive strip was attached to a test panel mounted vertically so that the contact area on the panel is 1 inch by 1 inch. The strip extended below the bottom of the panel and a one pound weight was attached to it with a spring clip. The fail time was indicated when the strip on shear parted from the panel, and allowed the weight to fall on a switch which stopped a timer. The temperature of failure was calculated from the elapsed time and the rate of temperature rise.

The 180 degree peel adhesion test is a measure of the strength of the adhesive bond formed. It was determined utilizing a TMI Peel Tester (Model No. 80-14-00). The procedure followed is that of PSTC-1. Peel adhesion is the average force required to remove a pressure sensitive tape from a panel, the tape being folded back on itself at 180 degrees, and pulled at 12 inches per minute. In conducting the test a 10×1 inch tape specimen was adhered to a stainless steel panel using the HMPSA of this invention. A 4.5 pound roller was passed over the specimen once in each direction. One end of the tape was then peeled back over itself at an angle of 180 degrees and placed in a moveable jaw. Thereafter, the tape is pulled at 12 inches per minute and the average peel strength obtained is reported in lbs/in. width of tape. For permanent label adhesives, strength of at least 3.0 lb/in. are desirable but for removable adhesive tapes, values of about 1.0 lb/in. are satisfactory.

Melt Index (MI) is determined according to ASTM D1238-577.

In the examples the following abbreviations are used: E=ethylene; nBA=n-butyl acylate; MAA=methacrylic acid.

EXAMPLES

Example 1

An adhesive composition was prepared with the following composition:
39.7 wt % E/nBA,(32.6 wt. % nBA, MI=34)
36.7 wt % 'Foral' 85 (Rosin ester Tackifier)
10.9 wt % 'Picco' AP-10 (Aromatic hydrocarbon Tackifier)
11.9 wt % 'Sunthene' 4240 (Naphthenic Oil Plasticizer)
0.8 wt % 'Irganox' 1098 (Antioxidant).
Adhesion tests gave the following values: Polyken tack 1518 g., SAFT 62° C., and 180 deg. peel adhesion of 1.8 lb./in. As a reference point, a commercially formulated adhesive based on a 'Kraton', indicated to be for the so-called 'mid-performance' market, was subjected to the same tests to give the following results: Polyken Tack 1600 g. SAFT 63° C. and 180 deg. peel 3.5 lb./in. The adhesive properties of the E/nBA copolymer adhesive composition were generally comparable except for a lower 180 deg. peel strength.

Example 2

In this example a mixture of E/nBA copolymers was used, consisting of 80 wt. % of a copolymer with 40 wt. % nBA, and an MI of 30 and 20 wt. % of a copolymer with 24 wt. % nBA and an MI of 6. The average nBA content was thus 36.8 wt. %. The copolymer component formed 39.7 wt % of the adhesive composition as in Example 1, and all other ingredients and amounts were the same as in Example 1. Properties were as follows: Polyken Tack 1404 g., SAFT 60° C. and 180 deg. peel 2.6 lb./in. Here peel was improved compared with Example 1.

Example 3

This composition was made using the same amount of the same polymer of Example 1. All other ingredients were the same except that a higher softening tackifier, 'Foral' 105 was used instead of 'Foral' 85. Properties were as follows: Polyken Tack 850 g., SAFT 62° C., and 180 deg. peel 3.75 lb./in. Changing tackifier resulted in improved peel at the expense of some reduction in tack.

Example 4

In this example the E/nBA used had an nBA content of 35.5 and an MI of 15. The amount of this polymeric component and all other components and amounts were identical to those in Example 3. The composition had the following properties: Polyken tack, 1170 g., SAFT 61° C., and 180 deg, peel 2.5 lb./in. This example shows that by increasing nBA level a little, the balance of tack and peel is changed somewhat in favor of tack.

Example 5

In this example, the E/nBA used also had an nBA content of 35.5, but had an MI of 30. All other components and amounts were the same as in Example 3 and 4. Properties were: Polyken Tack 1429 g., SAFT 56.5° C., and 180 deg. peel of 2.2 lb./in. This shows the effect of melt index. In a comparable composition, as melt index increases the SAFT decreases.

By way of comparison, a composition was made which shows the effect of very low melt index (high viscosity). The copolymer component consisted of a blend of 80 wt. % of an E/nBA resin with 40 wt. % nBA and an MI of 1.98 and 20 wt. % of an E/nBA resin with 24 wt. % nBA and an MI of 6. Average nBA content is 36.8 wt. %. MI of the blend was less than 5. All other ingredients and amounts were the same as in Example 3, 4 and 5. Properties were: Polyken Tack 280 g., SAFT 69° C., and 180 deg. peel 1.8 lb./in. This shows that when the MI is too low, tack suffers drastically, though SAFT increases. This may be compared with Example 5, where high MI reduced SAFT.

Example 6

This example shows the effect of increasing the nBA to 40 wt. % in the copolymer. The copolymer used was an E/nBA with 40 wt. % nBA and an MI of 15. All other components and amounts were the same as in Examples 3,4 and 5. Properties were: Polyken Tack 1012 g., SAFT 51.3° C. and 180 deg. peel 2.3 lb./in. As the nBA is increased, corresponding to a reduction in the crystallinity level of the copolymer, SAFT is drastically reduced. At this high level of nBA, adjustment in MI and/or a different formulation would be necessary to obtain a more desirable combination of adhesive properties.

Example 7

This example shows the effect of decreasing nBA level to 30 wt. % of the copolymer. The polymer used had only 30 wt. % nBA and the MI was 15 as in comparative Example 2. All other components and amounts were the same as in Examples 3, 4 and 5. Properties were as follows: Polyken Tack 379 g., SAFT 61° C., and 180 deg. peel 1.3 lb./in. As the nBA is decreased to the lower acceptable level, corresponding to a stiffer more crystalline resin, this particular formulation gave a low value for tack and 180 deg. peel. Very careful formulation would be necessary to achieve more desirable properties at this low nBA level.

Example 8

In this example, no 'plasticizer' was used, but a liquid rosin ester tackifier was included in the blend. While this tackifier is not commonly referred to as a plasticizer, some liquid tackifiers appear to serve a similar function. The copolymer component consisted of 80 wt. % of an E/nBA resin with 40 wt. % nBA and an MI of 30 and 20 wt. % of an E/nBA with 24 wt. % nBA and an MI of 6, the copolymer component being 31.9 wt. % of the adhesive composition, 36.8 wt. % 'Permalyn' 85 a rosin ester tackifier, 22.9 wt. % 'Herculyn' D, a liquid rosin ester tackifier and 0.5 wt. % of 'Irganox' 1098 antioxidant. Properties were as follows: Polyken Tack 972 g., SAFT 60° C., and 180 deg. peel 1.6 lb./in. While these properties are not as good as in some other examples, they nevertheless are considered acceptable.

Examples 9,10 AND 11

In these examples, a mixture of copolymers containing methacrylic acid was used as the polymer component. The polymer mix consisted of 85 wt. % of an E/nBA/MAA polymer containing 40 wt. % nBA and 3 wt. % MAA with an MI of 35 and 15 wt. % of a copolymer containing 24 wt. % nBA and 3 wt. % MAA with an MI of 12. Average nBA content of the mix was thus 37.6 wt. %. In Example 9 the polymer was used as is. In Example 10, 13.1% of the methacrylic acid groups were neutralized with zinc ions and in Example 11, 26.1% of the acid was neutralized with zinc ions. In all three examples the polymer component formed 39.7 wt. % of the composition, and all other components and amounts were the same as in Example 3. Properties were as follows:

|  | Polyken Tack, g. | SAFT °C. | 180 deg. peel. |
| --- | --- | --- | --- |
| Ex.9 | 1170 | 61 | 3.5 |
| Ex.10 | 1128 | 64 | 2.5 |
| Ex.11 | 1120 | 68 | 2.3 |

It can be seen that as the level of neutralization increases, the SAFT increases, but 180 deg. peel, though quite acceptable starts to drop.

Example 12

This example is similar to Example 1 except that the rosin ester tackifier used was 'Stabylite' Ester 10 instead of 'Foral' 85, and the plasticizer was 'Santicizer' 261 (octyl benzyl phthalate) instead of 'Sunthene' naphthenic oil. All quantities were the same. Polyken Tack was 688 g. and SAFT was 56° C. Peel was not measured. While properties would still be acceptable for some uses, the phthalate plasticizer gives poorer tack in this particular formulation.

'Foral' tackifiers are manufactured by Hercules Inc.
'Picco' tackifiers are manufactured by Hercules Inc.
'Stabylite' tackifiers are manufactured by Hercules, Inc.
'Santicizer' plasticizers are manufactured by Monsanto, Inc.
'Sunthene' plasticizers are manufactured by Sun Oil Co.

As many widely different embodiments of this invention may be made without departing from the spirit and scope thereof, it is to be understood that this invention is not limited to the specific embodiments thereof except as defined in the appended claims.

What is claimed is:

1. A hot melt pressure sensitive adhesive composition consisting essentially of (a) about 25 to 50% by wt. of copolymer having a melt index of about 5 to 40 g/10 min. of (i) about 60 to 70% by wt. of ethylene, (ii) about 30 to 40% by wt. of n-butyl acrylate, and (iii) 0 to about 5% by wt. of (meth)acrylic acid, based on the weight of the copolymer, with the acid being 0 to about 40% neutralized by metal ions and (b) tackifier and optionally, plasticizer, in an amount from about 50 to 75% by wt. based on the total weight of the composition whereby said composition is a pressure sensitive adhesive.

2. The adhesive composition of claim 1 wherein the amount of said acid is about 0.5 to 5% by wt.

3. The adhesive composition of claim 1 wherein said acid is methacrylic acid.

4. The adhesive composition of claim 1 wherein about 25 to 65% by wt. of said tackifier is present in the composition and about 5 to 25% by wt. of said plasticizer is present in the composition.

5. The adhesive composition of claim 1 exhibiting a shear adhesion failure temperature of at least 55° C.

6. The adhesive composition of claim 1 wherein said tackifier is selected from the group consisting of rosin acids derived from wood, gum or tall oil and their hydrogenated, disproportionated, mildly polymerized or ester derivatives; terpene resins; dicyclopentadiene-aromatic hydrocarbon resins; and low molecular weight styrene or substituted styrene resins.

7. The adhesive composition of claim 5 wherein said tackifier is rosin ester.

8. The adhesive composition of claim 4 wherein said plasticizer is selected from the group consisting of phthalates, azelates, adipates, tricresyl phosphate, polyesters, and low molecular weight alkylated phenol, phenol modified Coumarone-indene, terpene and synthetic terpene resins, and processing oils.

9. The adhesive composition of claim 8 wherein said plasticizer is naphthenic processing oil.

* * * * *